United States Patent Office 2,942,945
Patented June 28, 1960

2,942,945

PROCESS OF MAKING ALKALI SUBSILICATES

David J. Eisenberg, Oak Park, and Thomas Mauthner, Detroit, Mich., assignors to Nelson Chemicals Co., Detroit, Mich.

No Drawing. Filed Nov. 10, 1958, Ser. No. 772,679

12 Claims. (Cl. 23—110)

This invention relates to a novel product and to improvements in processes for making soluble alkali subsilicates, that is, to alkali silicates whose alkali content is not less than the silica content on a mole basis. More particularly, it relates to novel products and improvements in processes for making alkali subsilicates by the reaction of liquid caustic soda and solid silica-containing material.

PRIOR ART

It has long been known that alkalies (such as sodium hydroxide or sodium carbonate) react with silica, under various conditions, to produce alkali silicates. Thus, for example (1) $xNa_2O + ySiO_2 \rightarrow xNa_2O \cdot ySiO_2$ or (2) $2xNaOH + ySiO_2 \rightarrow xNa_2O \cdot ySiO_2 + xH_2O$ or (3) $xNa_2CO_3 + ySiO_2 \rightarrow xNa_2O \cdot ySiO_2 + CO_2$ Similar reactions also occur with other alkalies, such as potassium oxide, hydroxide, or carbonate. The first of the above reactions is schematic, since sodium oxide is not a stable compound, and is, in practice, produced in situ from sodium hydroxide or carbonate, by heating.

The commercial production of water glass (that is, of alkali silicates having molal ratios of alkali to silica of less than 1), and of alkali subsilicates (that is, of alkali silicates having molal ratios of alkali to silica of not less than 1) is also well established. In view of the lower cost of sodium compounds, as compared with that of other alkali metal compounds, the starting materials in such commercial processes are normally sodium hydroxide or carbonate, along with silica in some form.

The known alkali subsilicate compounds are the orthosilicate (having an alkali:silica molal ratio of 2), the sesquisilicate (having an alkali:silica molal rato of 1.5), and the metasilicate (having an alkali:silica molal ratio of 1:1). These products have very substantial utility as detergents or cleaning compounds, alone or in mixture with other materials.

The "standard" method of commercial production of alkali subsilicates is the "fusion method." In the "fusion" method for producing alkali subsilicates, an alkali carbonate, e.g. sodum carbonate, and silica are heated together in a continuous tank furnace of the glass-melting type to a temperature substantially above the fusion point of the system (that is, to a temperature substantially above that of the resulting alkali subsilicate, about 1100° C.). The fused product, after solidifying, is dissolved in water, and is then corrected to the proper alkalisilicate ratio by the addition of sodium hydroxide or water glass, as required. It is then necessary to concentrate the solution by evaporation, and to remove the alkali subsilicate by crystallization. The crystals are then dried and comminuted.

The chief advantage of the "fusion" method of preparing alkali subsilicates is the ease and completeness of reaction, due to the fluidity of the liquid reaction mass, and to the very high reaction temperature. Because of this, there is no difficulty in preparing alkali silicates (including subsilicates) of any desired compositon, e.g. orthosilicates, sesquisilicates, or metasilicates of high purity. Furthermore, there is no difficulty in producing anhydrous products. On the other hand, there are also some very serious disadvantages to the "fusion" method, namely the extremely high cost of plant and equipment, the high repair charges due to the slagging effect on the furnace linings, the high consumption of fuel necessary to reach and maintain the operating temperatures and to evaporae the large quantity of water used for dissolving the fused reaction product, and the cost of comminution of the dried crystals in order to achieve a reasonably large surface area for rapid dissolution in commercial use.

Because of these disadvantages, there have been numerous efforts toward modifying the above reaction procedure. One such modification was proposed by Burkhart and Riggs in 1937 (U.S. 2,083,545, Re. 21,703). In this process, solid caustic alkali (e.g. NaOH) and finely divided solid silica are reacted together in the solid state in an externally-heated mixing device at an elevated temperature but below the melting point of the caustic alkali (e.g. between 175° C. and 250° C.). Water may be added, not in excess of 7%, in order to help initiate the reaction and to lubricate the mixture. The solid reactants are generally heated up to about 175° C. in the mixer within about six minutes. At this point, reaction ensues and a viscous flowable mass forms. In about 2 to 2½ more minutes, the reaction becomes vigorous. The temperature rises to 200 to 225° C. and a plastic material forms. In about another minute, this begins to change to a granular condition. In another 1½ to 2 minutes, this granulation is completed. The resulting product contains most of the free water formed during the reaction. Therefore (as can be seen from Reaction 2 above), the product is substantially the monohydrate. If it is desired to produce an anhydrous product, the product is "dressed," by heating to about 450° C. in a rotary drier. This dehydration step takes about 30 to 60 minutes.

It appears that, in the Burkhart-Riggs process, the initial reaction between the silica and caustic alkali may occur while both reactants are in the solid state. Apparently, a small amount of silica first reacts with the caustic alkali, forming an alkali silicate which is very high in alkali and correspondingly low in silica. This evidently depresses the melting point of the caustic alkali sufficiently to create the formation of some liquid solution, particularly if there is a slight amount of water present, but the liquid thus formed is mixed with a relatively large quantity of solid, so that it has a pastelike consistency. The presence of this small amount of liquid solution evidently markedly accelerates the reaction, so that more silica reacts rapidly. Evidently this at first increases the proportion of liquid solution in the "plastic mass." However, further increase in the amount of dissolved silicate eventually must increase the melting point of the bath, since the melting points of the silicates are much higher than that of caustic alkali (being well over 1000° C.) Thus, the plastic mass must eventually "solidify." Since a supercooled solution cannot be maintained for more than a few minutes under the agitated conditions of the reaction, the entire reaction is necessarily completed very rapidly, once it starts.

This reaction mechanism appears to account for the phenomena described above, as given by Burkhart and Riggs. It also accounts for the fact that this process cannot make alkali metasilicates, but is limited to the sesqui- and orthosilicates. The explanation of this fact is that the meta has the greatest relative proportion of silica of the three alkali subsilicate compounds, and it is simply not possible to react this amount of silica under these conditions before the granulation occurs. Thus, if one adds enough silica to form the metasilicate, most of the excess above that required to produce the sesquisilicate will remain unreacted.

Thus, while the Burkhart-Riggs process has the advantages of eliminating the continuous tank furnace used in the "fusion" process, and of eliminating the need for comminution, it suffers from the disadvantages that the product is not anhydrous (unless a time-consuming and costly "dressing" operation is used), and that it is too inflexible to permit the production of the metasilicate. In addition, the mixing equipment is subjected to extensive wear and deterioration, because of the large amount of abrasion in the solid state and mechanical working in the "plastic" stage.

A process which is apparently related in principle to the Burkhart-Riggs process is that of Beecher and Roderick (U.S. 2,357,723, issued in 1944). In this process, a small amount (up to 3%) of finely divided silica is added in a mixing chamber to hot liquid caustic soda at 390 to 400° C. The sensible heat of the caustic soda, together with the heat of operation, is sufficient to maintain it in a fluid state for a sufficient time to permit the reaction to be completed in the liquid state. This requires only about one minute, since the extent of reaction is so small. Even so, a precipitate tends to form, which is mechanically difficult to handle. In order to prevent this, the entire reaction mass is rapidly chilled in a flaking wheel.

This process is not suitable for making alkali subsilicate compounds (i.e. orthosilicate, sesquisilicate, or metasilicate), since the amount of silica which can be added without any precipitation is very small. Nevertheless, this process is interesting in that it tends to support the reaction mechanism indicated above for the Burkhart-Riggs process. It also indicates the difficulty of dissolving substantial quantities of silica in liquid caustic alkali, even when the latter is considerably superheated.

Another process, by which alkali subsilicates can be produced, is the "wet digestion" process. In a sense, it is an extension of the Beecher-Roderick process described above—namely, the dissolution of solid silica-containing materials in a liquid caustic alkali. In this process, water glass or silica is digested with a concentrated solution of caustic alkali, e.g. NaOH. This requires the application of considerable external heat, in order to keep the reaction product in the liquid state. The reaction rate is limited by the heating rate, and is thus relatively slow. The reaction proceeds until the silica is completely reacted, e.g. until the orthosilicate, sesquisilicate, or metasilicate is produced in solution. The resulting solution is then evaporated and cooled to a suitable crystallization temperature. It is then seeded, agitated, and cooled to remove the heat of crystallization. The resulting crystals of alkali subsilicate are removed, dried, and comminuted. This process makes it possible for a manufacturer to produce alkali subsilicates without requiring the installation or operation of an expensive continuous tank furnace. However, the remainder of the process still suffers from substantially the same disadvantages as the fusion method—namely the costs of evaporation, drying, and comminution.

In 1937, Davies (U.S. 2,100,944, Re. 22,951) disclosed an improvement over the conventional "wet digestion" process. This process, like the conventional "wet digestion" process, is a reaction between solid silica or solid water glass and liquid caustic alkali, e.g. NaOH. It is also like the Beecher-Roderick process, in that the caustic alkali is superheated to a temperature of 300–500° C., and that no additional heat is used. However, as indicated by Beecher-Roderick, if a substantial amount of silica is used, e.g. enough to produce the orthosilicate or the sesquisilicate, precipitation of solids in the liquid phase is inevitable, even though the caustic alkali has been preheated, so long as the temperature is below the melting point of the product (well over 1000° C.).

Thus, in the Davies process, one starts with preheated caustic alkali, e.g. NaOH, at a temperature of about 400° C., and, for example, adds with mixing enough silica to form the sesquisilicate. The reaction is complete in about four minutes, the mass becomes plastic during a further thirteen minutes and starts to crumble, and is discharged in a further three minutes as a free-flowing, technically anyhydrous, granular material. No further evaporation or dehydration is required, as the water formed in the reaction is evolved as steam during the process. The total reaction times are about twenty minutes for the production of sodium orthosilicate or sesquisilicate from silica (and about five or six minutes when the more expensive water glass is used instead of silica).

The course of the Davies reaction is very similar to that in the Burkhart-Riggs process. In both cases, the principal reaction involves the solution of solid silica in a liquid solution which is alkali-rich with respect to the final product. In both cases, the reaction is very rapid once it starts. In both cases, the reaction mass becomes "plastic" and eventually granular. And in both cases, the metasilicate cannot be produced, evidently because it is not possible under these conditions to react this amount of silica before the granulation occurs. The principal difference is that the temperature in the Davies process is above the melting point of the pure caustic alkali, while it is below this temperature in the Burkhart-Riggs process. As a result, there is sufficient sensible heat in the Davies process to evaporate the water formed in the reaction, whereas this requires a separate heating step in the Burkhart-Riggs process.

Thus, the Davies process and the Burkhart-Riggs process (both of the patents being incidentally assigned to the same company, Pennsylvania Salt Manufacturing Co., and issued in the same year) are very similar in principle and result. The principal difference is that in Davies the superheating of the caustic alkali prior to the reaction causes the evaporation of the water formed during the reaction; but otherwise the course of the reaction, once initiated, is substantially the same.

The principal disadvantage of the Davies process is its inflexibility, in that it is unable to react enough silica to produce the metasilicate. On the other hand, it has the advantages of being very rapid (and thus increasing productivity), and of being low in equipment cost.

PRESENT STATE OF THE ART

In view of the above, an improvement over the Davies process, which would continue to profit by its advantages, without being limited to the production of the orthosilicate and sesquisilicate, would clearly be very welcome in the art. However, the processes already known appear to use all the possible combinations in the reaction of the alkali and the acid ingredient silica—namely: (1) entirely liquid, with external heating ("fusion" method), (2) solid-solid, with external heating (Burkhart-Riggs), (3) liquid solution-solid, with external heating ("wet digestion" method), and (4) superheated liquid solution-solid, with no external heating (Davies and Beecher-Roderick methods). Of these methods, only the ones which maintain a body of liquid alkali-rich solution by external heating (i.e. Methods 1 and 3) are sufficiently flexible to permit the reaction of enough silica to form the metasilicate; but these processes are slow because of the time required for heating, and hence are low in productivity and high in cost. The Davies method eliminates the need for external heating, by preheating the liquid caustic alkali; however, this preheating does not seem to speed up the reaction itself, since it cannot go as far as the formation of the metasilicate, but merely provides enough heat for the in situ evaporation of the water formed. Therefore, we seem to be up against a "barrier" beyond which we cannot go—namely, it evidently is not possible to speed up the reaction sufficiently, by adding preheat, to enable enough silica to react to form the metasilicate, in the absence of prolonged external heating.

SCOPE OF THE PRESENT INVENTION

The present invention in some respects constitutes an improvement over the Davies process for producing alkali subsilicates by the reaction of solid silica-containing material and liquid caustic soda. It differs conceptually in that the solid silica-containing material is preheated, and it differs in result in a number of rather remarkable ways—namely: (1) The reaction is faster than the Davies reaction, and is in fact, virtually instantaneous; (2) There is no observable "plastic" stage; (3) Despite the extreme rapidity of the reaction, it is possible to produce metasilicates; (4) Because of the extremely rapid evolution of steam, the product is itself unusual in physical properties being very low in moisture content and containing many open-cell pores, and consequently having unusually low bulk density and high surface area for rapid solution.

Contrary to what the prior art appears to establish, we have found that it is possible to speed the reaction up further by preheating, and thereby permit enough silica to react to form the metasilicate. However, what is required is preheating the solid silica-containing material, under certain conditions which are specified in detail below. In addition, we have found that the reaction proceeds in a very unexpected manner, with unexpectedly advantageous results, which are described in detail below.

OBJECTS

An object of the present invention is thus to provide a process for the production of alkali subsilicates by the rapid reaction of liquid caustic alkali and preheated solid silica-containing materials, under agitation.

A second object of the present invention is to provide a process for the rapid reaction of liquid caustic alkali and solid silica-containing materials, without requiring external heating during the course of the reaction, which will permit sufficient silica to react to form the alkali metasilicate.

A third object of the present invention is to provide a process for the production of anhydrous alkali subsilicates by the rapid reaction of liquid caustic alkali and preheated solid silica-containing materials, with in situ evolution of steam during the course of the reaction.

A fourth object of the present invention is to provide a process for the production of anhydrous alkali subsilicates by the rapid reaction of liquid caustic alkali and preheated solid silica-containing materials, under agitation, forming in situ a granular material, without requiring additional comminution or drying.

A fifth object is to provide, as novel products, anhydrous alkali subsilicates of low bulk density, having open-celled porous structures, which have high dissolving speeds, high absorptive power for liquids, and low hygroscopicity.

ADVANTAGES

An advantage of the present invention is that it is possible to produce alkali orthosilicate, sesquisilicate, or metasilicate without requiring expensive heating, evaporating, drying, or comminuting equipment, and without high fuel costs.

A second advantage of the present invention is that very high productivity, and hence very low operating cost, is made possible by the extreme rapidity of the reaction.

A third advantage of the present invention is that the products are highly porous—the pores comprising an open cellular structure—so that they dissolve very rapidly in use.

A fourth advantage of the present invention is that the products have low bulk densities, commensurate with their open cellular structure, and hence have high absorptive capacities for liquids such as detergents or solvents.

A fifth advantage of the present invention is that the products are very low in hygroscopicity.

A sixth advantage of the present invention is that the products are very low in moisture content.

DESCRIPTION OF THE INVENTION

(a) General description

The present invention is based on the discovery that if liquid caustic alkali (e.g. NaOH) and preheated solid silica-containing material are agitated together, under certain conditions, a virtually instantaneous reaction occurs, which goes so far as to produce granular anhydrous alkali orthosilicate, sesquisilicate, or metasilicate, depending on the relative proportions of the reactants, without external heating of the reaction mass.

(b) The Caustic alkali reagent

The term "caustic alkali," as used herein, refers to any alkali metal hydroxide, such as, for example sodium hydroxide or potassium hydroxide. Since the products of the invention must normally be low in cost for use as detergents or cleaning compounds, sodium hydroxide (also called "caustic soda") will be used herein by way of illustrating various preferred embodiments of the invention.

It is preferred to use substantially anhydrous caustic soda in the reaction, since the presence of excess water simply tends to retard the reaction, because of the need for additional heat absorption. However, the molten caustic alkali may contain as much as about 15% water, if this much water can remain in solution at the caustic alkali reagent temperature, without having an excessively retarding effect on the reaction, and while still producing a technically anhydrous product.

We may thus, for example, start with solid caustic soda and heat it to melting in a separate melting pot. Alternatively, we may start with liquid caustic soda, as it is commercially available in the 50 or 73% NaOH form for example (the remainder being water), and heat this in a caustic pot to about 400–450° C. to evaporate the water. In any event, the temperature of the liquid caustic soda will then be adjusted (by heating or cooling, if necessary) to the desired reaction temperature.

As a minimum, the temperature of the caustic alkali reactant would be its melting point in the anhydrous condition, which, in the case of caustic soda is 318° C. Generally, however, we prefer to use the caustic alkali reactant in the super-heated condition. Generally, the amount of superheat should not exceed about 50° C., in order to avoid an excessively violent reaction, and as a maximum, the caustic alkali temperature should not exceed about 450° C. The preferred amount of superheat depends on the extent of the reaction desired, i.e. whether the orthosilicate, sesquisilicate, or metasilicate is to be produced. In the production of sodium orthosilicate, the caustic soda temperature should preferably be in the range of about 325 to 335° C. In the production of sodium sesquisilicate—which requires the reaction of 50% more silica—the caustic soda temperature should preferably be in the range of about 340 to 355° C. In the production of sodium metasilicate—which requires the reaction of twice as much silica as in the case of the orthosilicate—the caustic soda temperature should preferably be in the range of about 360 to 365° C.

(c) The silica-containing reagent

The term "silica-containing material," as used herein, includes silica $SiO_2$, and water glass (i.e. alkali silicates containing a molal excess of silica over alkali). The silica may be of any desired purity and fineness to promote the reaction, and may be anhydrous or hydrated. It may be in an amorphous or a crystalline form. It will normally be preferred to use high purity silica, except where the impurities are not reactive, or are not harmful if reactive. In general, finely divided silica or water glass is preferred, in order to allow rapid reaction rates.

Before entering the reaction zone, the silica-containing material is, according to the present invention, preheated to a temperature sufficient to sustain the reaction, along with the enthalpy of the caustic alkali and the exothermic heat of reaction. If the temperature is too low, the reaction will not go to completion, or the product will not be anhydrous or, in any event, the reaction rate will so be reduced as to alter the reaction mode and produce a product which fails to have the desired open-celled porous structure. On the other hand, if the temperature is too high, an excessively violent reaction occurs. In general, the temperature of the silica-containing material should be within the range of about 120° C. to 350° C., depending on such factors as the temperature of the caustic alkali, the amount of water contained in the reagents, the amount of water evolved in the reaction, the amount of heat evolved in the reaction, and the relative amount of silica which must react within the short time available for reaction. As a general proposition, the lower the caustic temperature and the greater the water content of the reactants, the higher the silica temperature should be; and the greater the relative amount of silica to be reacted, the higher the silica temperature should be. When water glass is used as the silica-containing material, it greatly reduces the amount of silica which must react (since much of it is already "neutralized" with alkali, in the water glass); therefore, lower temperatures may be used in such cases. In any event, in order to obtain completeness of reaction and of evaporation, along with the unusual type of product referred to above, the temperature of the silica-containing material should be in the range of about 120° to 350° C., as indicated above.

In the case of the production of sodium orthosilicate from caustic soda and silica, the silica charging temperature is preferably in the range of about 180 to 195° C. In the production of sodium sesquisilicate, the silica temperature is preferably in the range of about 205 to 215° C. In the production of sodium metasilicate, the silica temperature is preferably in the range of about 215 to 225° C.

(d) Reaction procedure

The liquid caustic alkali, adjusted to the appropriate predetermined temperature, is contained in a suitable agitated vessel, with means for exhausting the steam evolved during the reaction. No external heating is required. For example, an open nickel vessel equipped with a screen at the top may be used. Since the entire process is extremely rapid, it is not even necessary to insulate the reaction vessel with refractory.

Preheated silica in approximately the theoretical amount required to produce the desired product is added to the liquid caustic alkali in the reaction vessel, with good agitation of the bath. The reaction is virtually instantaneous, without being violent, a granular product being formed. The reaction is complete within about 1 minute. No recognizable plastic phase appears, as occurs in the Davies process. The agitation may be continued at a lower speed for an additional 4 to 5 minutes in order to reduce further the moisture content, down to about 2–3.5%. The product is immediately discharged and is ready for marketing, the total time in the reactor being only about 1 or 2 minutes for a technically anhydrous (up to 10% moisture) product, or about 6 minutes for a product containing about 2–3.5% moisture. The product has a low bulk density and high porosity, and is low in hygroscopicity. Microscopic examination reveals an open-celled structure.

The low hygroscopicity of the product is believed to be attributable to the small amount of water initially contained in the product, as compared with the usual commercial (technically anhydrous) product. Such low moisture contents (e.g. 2% moisture) are unheard of, except when the fusion process is used.

(e) Examples

By way of illustration and not limitation, the following examples indicate several preferred embodiments of the improved process and product of the present invention.

EXAMPLE I 60 parts of pure silica sand at 185° C. were added with agitation to 165 parts of liquid NaOH at 330° C. in an uninsulated open vessel. A smooth reaction, with evolution of stream, occurred, which was complete within about 1 minute after the completion of the addition of the silica. Although the silica was 145° C. colder than the liquid caustic soda, the reaction temperature remained substantially constant during the reaction, on account of the exothermic heat of reaction. The bulk density was 0.55 g./ml., as compared with approximately 0.8 to 1.1 g./ml. for commercial sodium orthosilicate produced by conventional means. Microscopic examination showed a highly porous, open-celled structure. As an indication of the product's high liquid absorption power, 50 grams of the product were mixed in a graduated cylinder with 50 cc. of an aromatic solvent. Only about 10 cc. of unabsorbed liquid remained. In a similar test, using 50 grams of commercial sodium orthosilicate produced by conventional means, 30 cc. of liquid remained unabsorbed. Thus, the liquid absorptive power of the present product was about double that of the ordinary product.

EXAMPLE II 60 parts of pure silica sand at 210° C. were added to 125 parts of liquid NaOH at 350° C. The course of the reaction was substantially the same as described in Example I. The product comprised anhydrous sodium sesquisilicate, containing about 1.0% insolubles. Its bulk density was 0.58 g./ml., as compared to about 0.85 for commercial sodium sesquisilicate. Microscopic examination showed a highly porous, open-celled structure.

EXAMPLE III 60 parts of pure silica sand at 220° C. were added to 85 parts of liquid NaOH at 360° C. The course of the reaction was substantially the same as described in Example I. The product comprised anhydrous sodium metasilicate, containing about 3% insolubles. Its bulk density was 0.56 g./ml., as compared to about 0.88 for commercial sodium metasilicate. Microscopic examination showed a highly porous, open-celled structure.

(f) Limiting factors in the reaction

In order to accomplish the reactions described above, it is necessary to balance correctly several factors.

As to concentrations, there are no complications. The reactions in question are, in essence, neutralization reactions, and tend to proceed quantitatively to completion. In general, therefore, substantially stoichiometric quantities of caustic alkali and silica-containing material are used. If it is desired to minimize insolubles (such as unreacted silica), it may be desirable to use a small deficiency of silica, as compared to the amount theoretically required for the particular alkali subsilicate desired. It is thus possible, by properly proportioning the reactants, to produce alkali orthosilicates, sesquisilicates, metasilicates, or mixtures thereof.

Reaction times are extremely short (approximately 1 minute), since these are neutralization reactions. This is a very great prospective advantage, since it makes possible very high productivities and hence low costs of equipment. However, unless appropriate reaction conditions (thermal conditions and phase relations) are maintained, this rapidity of reaction may prove to be very disadvantageous. For, as the reaction occurs, there tend to be extreme changes in thermal conditions and phase relations, which may cause the reaction to stop short, far from completion. For example, if there is insufficient enthalpy of the components, the product will not by anhydrous (as in the Burkhart-Riggs process), and if the phase relations change more rapidly than the reaction can proceed, the reaction will not go to completion (as occurs in the Burkhart-Riggs and Davies processes when it is attempted to produce the metasilicate). As a matter of fact, the full benefit of the speed of this chemical neutralization reaction has never been realized in prior practice, but is realized for the first time in the present invention—in which the shortest process times and greatest productivities are attained.

The proper phase conditions are vital to the success of the reaction. As indicated by the prior art and the present invention, the presence of a liquid phase is essential to rapidity and completeness of the reaction. It is not necessary to dissolve everything, including the product (as in the "fusion" process), but it is necessary to provide a liquid matrix which remains at least partly liquid until the end of the reaction. Since silica is very high in melting point, this necessarily means that the caustic alkali must be in the liquid phase. As indicated by the Burkhart-Riggs process, unless the caustic alkali is entirely (or substantially entirely) molten prior to reaction, the reaction is impeded insofar as evolution of water and completeness of reaction of silica to produce the metasilicate are concerned. Therefore, it is clear that the caustic alkali must be liquid at the start, and that it must remain liquid (or partly liquid) until the chemical reaction is completed. But it is recognized that as more and more silica reacts, the melting point of the liquid solution is increased greatly, because of the high melting point of the silicate product. Thus, there is a race between "solidification"—or loss of mobility and reactivity—of the matrix, on the one hand, and the chemical reaction and consequent increase of melting point of the matrix on the other. If the reaction is impeded for any reason, "solidification" will occur before the reaction has had a chance to be completed, in which case the ultimate completion of the reaction will be prevented by the adverse phase conditions thus reached. This is particularly true in the case of the metasilicate, because of the large amount of silica which must react.

The improvement provided by Davies has been largely to perceive the importance of the thermal conditions of the reaction. In order to evaporate the water formed in the reaction, it is necessary to add heat beyond the exothermic heat of reaction. If this is to be done during the course of the reaction, it can only be accomplished by increasing the enthalpy of the reaction mass before the reaction, rather than during it. In other words, the additional enthalpy must be contained initially in the reactants. Since the caustic alkali is to be molten, in any event, Davies takes the more or less obvious route of superheating the caustic further, above its melting point, to an extent sufficient to evaporate the water formed during the reaction. (A temperature of about 400° C. is generally sufficient for this purpose when producing sodium subsilicates, as shown by Davies.) So far as can be understood, at this point, nothing is to be gained by distributing this additional enthalpy or "preheat" among both (or all) the reactants, since all that matters is the total enthalpy of the reactants, and it is obviously more convenient to heat one reactant (which is already hot) than to heat two or more.

The present invention, however, constitutes an improvement over Davies in that it stresses not only the importance of the thermal content insofar as total enthalpy of reactants is concerned, but also stresses that the proper distribution of enthalpy of reactants is essential to full realization of the rapidity of the chemical reaction (thus increasing productivity, and also making it possible to produce the metasilicate).

In the present invention, the caustic alkali is molten at the start, and may also be superheated; in addition, the solid silica-containing material is preheated to such an extent that there is sufficient total enthalpy of the reactants to evaporate substantially all of the water during the reaction. It is not generally desirable to use silica temperatures as high as that of the molten caustic alkali, because this provides excessive total enthalpy and renders the reaction excessively violent. Thus, the solid silica-containing reactant will normally be lower in temperature than the molten caustic alkali, on account of the total enthalpy balance. Furthermore, the temperature of the molten caustic alkali reagent will be somewhat lower than that used by Davies (i.e. generally lower than about 400° C., when preparing sodium subsilicates), for the same reason.

It has been found, in the present invention, that the temperature of the preheated silica-containing material must be in the range of about 120 to 350° C. Lower temperatures fail to produce complete reactions, or fail to produce the desired porous open-celled structure of the reaction product. Higher temperatures provide excessive ethalpies, and hence excessively violent reactions.

It is by no means obvious, or even clear, why any distribution of ethalpies among the reactants should be significant. This is especially puzzling in view of the fact that the great bulk of the added enthalpy is in the liquid caustic alkali in any event even if it is not superheated above its melting point, in view of its higher temperature and its latent heat of fusion. Calculations indicate that the enthalpy provided by the preheated silica-containing material will normally be only about a tenth to a quarter of the total enthalpy of the reactants. Therefore, it is difficult to understand why it should be very significant. A possible explanation—to which we do not limit ourselves—is that unless the temperature of the solid silica-containing reagent is reasonably close to that of the liquid matrix, there is a retarding effect on the chemical reaction, in that the silica must first be heated by the liquid matrix before it reacts. When a cold silica molecule contacts a hot caustic alkali molecule, there may be insufficient mutual energy of activation to cause reaction, and all that happens is a transfer of thermal energy between the two. What is required for reaction is not necessarily the same temperature for both reactants, but a sufficient total energy of both molecules—and that means that neither reactant should be at too low a temperature initially. If the temperature difference is too great, the time required for the thermal adjustment may be enough to prevent the reaction from going to completion before "solidification" of the reaction mass occurs, especially in the case of metasilicate production. In other words, there may be a three-way "race," rather than a two-way race—i.e., a race between the attainment of thermal equilibrium, chemical equilibrium, and phase equilibrium. Distributing the enthalpies of the reactants, then would substantially remove the retarding effect of thermal nonequilibrium on the chemical reaction.

Another complicating factor in this "balancing" of reactant enthalpies, is that it is generally preferable to superheat the liquid caustic alkali above its melting point to some extent, rather than adding additional preheat to the solid silica-containing materials to equalize their initial temperatures. Thus, for example, in the production of sodium metasilicate, it has been found preferable to superheat the liquid caustic soda to about 360° C., even though this keeps the preheated silica temperature (on a total enthalpy balance basis) down to about 220° C. The reason for this is very difficult to understand. A possible explanation—to which we do not limit ourselves—is that as silica reacts with the liquid bath and raises its melting point (hence tends to cause it to "solidify" and thus substantially stop the reaction), the released exothermic heat of reaction is not re-distributed throughout the entire bath fast enough to make up for the loss of enthalpy due to evaporation of water. This would tend to indicate again that the rate of attainment of thermal equilibrium is slower than that of the chemical reaction itself, and hence tends to permit premature "solidification" before the reaction is completed.

It thus appears, from both an experimental and a theoretical point of view, that the reaction in question is intricate in nature. In principle, it is simply a very rapid neutralization reaction; but, in practice the increasing tendency towards "solidification," as the reaction proceeds, the retarding tendency of thermal non-equilibrium, and the mutual interactions among these factors, tends to make predictions difficult in this area, and to require intelligently planned experimentation.

In any event—whatever the correct explanation may be—it has clearly been found in this invention that a "balance" of reactant enthalpies of the type described above is indispensable to achieving maximum overall reaction rate, and hence to substantial completion of the reaction (particularly in the metasilicate case) and to the production of the open-celled porous structure of the product.

When these factors are properly balanced, the reaction proceeds in a truly amazing manner. The solid is charged into the liquid, and substantially instantaneously (within about a minute) the entire reaction mass turns into a different expanded or porous "solid," without ever appearing to go through any distinguishable intermediate stage. So far as we are aware, no other reaction of this type is known.

(g) *Summary*

Thus, by our invention, we have provided alkali subsilicate products having novel and valuable properties, and a process for preparing these products.

More specifically, we have provided alkali subsilicates having open-cell porous structures, low bulk density, high liquid absorptive capacity, rapid dissolving power, and low hygroscopicity.

Further, we have provided improvements in processes for producing alkali subsilicate compounds, including the orthosilicate, sesquisilicate, and metasilicate, by the virtually instantaneous reaction of liquid caustic alkali and preheated solid silica-containing materials.

While we have thus described various embodiments of our invention, it is understood that various modifications in the details may be made without departing from the spirit of said invention, the principal novel features of which are set forth below.

Having now fully described our invention, we claim:

1. In a process of preparing a granular alkali subsilicate product which comprises adding molten caustic alkali containing not more than approximately 15% water by weight, and a solid sub-divided, silica-containing material selected from the group consisting of silica and alkali metal silicate having a molecular ratio of $SiO_2$ to alkali oxide greater than 1 to 1, to a reaction zone, the reactants being present in such molecular proportions that the alkali oxide content is not substantially less than the silicon dioxide content and is not greater than approximately twice said silicon dioxide content, reacting the mixture while agitating, sufficient to form a granular alkali subsilicate product—the improvements comprising: preheating said silica-containing material, prior to admission to said reaction zone, to a temperature within the range of about 120 to 350° C., and heating said caustic alkali, prior to admission to said reaction zone to a temperature within the range of the melting point of said caustic alkali in its anhydrous condition and about 450° C.

2. The process of claim 1, wherein a sodium subsilicate product is formed by the reaction of molten caustic soda containing not more than approximately 15% water, and a solid, sub-divided, silica-containing material selected from the group consisting of silica and a sodium silicate having a molecular ratio of $SiO_2$ to $Na_2O$ greater than 1 to 1.

3. In a process of preparing a porous solid, technically anhydrous, alkali subsilicate product which comprises adding molten caustic alkali containing not more than approximately 15% water by weight, and a solid, sub-divided, silica-containing material selected from the group consisting of silica and alkali metal silicate having a molecular ratio of $SiO_2$ to alkali oxide greater than 1 to 1, to a reaction zone, the reactants being present in such proportions that the alkali oxide content is not substantially less than the silicon dioxide content and is not greater than approximately twice said silicon dioxide content, reacting the mixture while agitating sufficient to free the mixture substantially of water and to form a porous, open-celled solidified alkali subsilicate—the improvements comprising: preheating said silica-containing material, prior to admission to said reaction zone, to a temperature within the range of about 120 to 350° C.; and heating said caustic alkali prior to admission to said reaction zone to a temperature within the range of the melting point of said caustic alkali in its anhydrous condition and about 450° C., the total enthalpy of said reactants being sufficient, along with the exothermic heat of reaction, and without the use of additional external heating, to cause the evaporation of substantially all water from the reaction mixture under the conditions of the reaction.

4. The process of claim 3, wherein a sodium subsilicate product is formed by the reaction of caustic soda containing not more than approximately 15% water by weight, and a solid sub-divided, silica-containing material selected from the group consisting of silica and a sodium silicate having a molecular ratio of $SiO_2$ to $Na_2O$ greater than 1 to 1.

5. In a process of preparing a granular sodium subsilicate product which comprises adding molten caustic soda containing not more than approximately 15% water by weight, and solid, sub-divided silica to a reaction zone, the reactants being present in such proportions that the $Na_2O$ content is not substantially less than the silicon dioxide content and is not greater than approximately twice said silicon dioxide content, reacting the mixture while agitating, sufficient to form a granular sodium subsilicate, the improvements comprising: preheating said silica, prior to admission to said reaction zone, to a temperature within the range of about 120 to 350° C.; and heating said caustic soda, prior to admission to said reaction zone, to a temperature within the range of about 318 to 450° C.

6. The process of claim 5, wherein the reactants are present in the approximate molecular proportions of $2Na_2O$ to $1SiO_2$, the resulting product comprising sodium orthosilicate.

7. The process of claim 5, wherein the reactants are present in the approximate molecular proportions of $1½Na_2O$ to $1SiO_2$, the resulting product comprising sodium sesquisilicate.

8. In a process of preparing a porous solid, technically anhydrous, sodium subsilicate product which comprises adding approximately 100% molten caustic soda, and solid, sub-divided silica to a reaction zone, the reactants being present in such proportions that the $Na_2O$ content is not substantially less than the silicon dioxide content and is not greater than approximately twice said silicon dioxide content, reacting the mixture while agitating, sufficient to form a porous open-celled solidified sodium subsilicate, the improvements comprising: preheating said silica, prior to admission to said reaction zone, to a temperature within the range of about 120 to 350° C.; and heating said caustic soda, prior to admission to said reaction zone, to a temperature within the range of about 318 and 450° C., the total enthalpy of said reactants being sufficient, along with the exothermic heat of reaction, and without the use of additional external heating, to cause the evaporation of substantially all water from the reaction mixture under the conditions of the reaction.

9. The process of claim 8, wherein the reactants are present in the approximate molecular proportions of $2Na_2O$ to $1SiO_2$, the resulting product comprising sodium orthosilicate.

10. The process of claim 8, wherein the reactants are present in the approximate molecular proportions of $1\frac{1}{2}Na_2O$ to $1SiO_2$, the resulting product comprising sodium sesquisilicate.

11. In a process of preparing a granular sodium metasilicate product which comprises adding molten caustic soda containing not more than approximately 15% water by weight, and solid, sub-divided silica to a reaction zone, the reactants being present in the approximate molecular proportions of $1Na_2O$ to $1SiO_2$, reacting the mixture while agitating, sufficient to form a granular sodium metasilicate, the improvements comprising: preheating said silica, prior to admission to said reaction zone, to a temperature within the range of about 120 to 250° C.; and heating said caustic soda, prior to admission to said reaction zone, to a temperature within the range of about 318 to 450° C.

12. In a process of preparing a porous solid, technically anhydrous, sodium metasilicate product which comprises adding approximately 100% molten caustic soda, and solid, sub-divided silica to a reaction zone, the reactants being present in the approximate molecular proportions of $1Na_2O$ to $1SiO_2$, reacting the mixture while agitating, sufficient to form a porous open-celled solidified sodium metasilicate, the improvements comprising: preheating said silica, prior to admission to said reaction zone, to a temperature within the range of about 120 to 350° C.; and heating said caustic soda, prior to admission to said reaction zone, to a temperature within the range of about 318 and 450° C., the total enthalpy of said reactants being sufficient, along with the exothermic heat of reaction, and without the use of additional external heating, to cause the evaporation of substantially all water from the reaction mixture under the conditions of the reaction.

References Cited in the file of this patent

UNITED STATES PATENTS

| | | |
|---|---|---|
| Re. 22,951 | Davies | Dec. 23, 1947 |
| 2,230,909 | Riggs et al. | Feb. 4, 1941 |
| 2,357,723 | Beecher et al. | Sept. 5, 1944 |
| 2,860,034 | Mockrin | Nov. 11, 1958 |